(12) United States Patent
Andriuskevicius

(10) Patent No.: US 12,114,650 B2
(45) Date of Patent: Oct. 15, 2024

(54) DEVICE FOR RETRIEVING THE SNAGGED FISHING LURE

(71) Applicant: Rytis Andriuskevicius, Vilnius (LT)

(72) Inventor: Rytis Andriuskevicius, Vilnius (LT)

(73) Assignee: Rytis Andriuskevicius, Vilnius (LT)

( * ) Notice: Subject to any disclaimer, the term of this patent is extended or adjusted under 35 U.S.C. 154(b) by 105 days.

(21) Appl. No.: 17/922,981

(22) PCT Filed: May 3, 2021

(86) PCT No.: PCT/IB2021/053678
§ 371 (c)(1),
(2) Date: Nov. 3, 2022

(87) PCT Pub. No.: WO2021/224756
PCT Pub. Date: Nov. 11, 2021

(65) Prior Publication Data
US 2023/0232809 A1 Jul. 27, 2023

(30) Foreign Application Priority Data
May 4, 2020 (LT) .............................. PA 2020 524

(51) Int. Cl.
*A01K 97/24* (2006.01)
(52) U.S. Cl.
CPC .................... *A01K 97/24* (2013.01)
(58) Field of Classification Search
CPC ..................................................... A01K 97/24
See application file for complete search history.

(56) References Cited

U.S. PATENT DOCUMENTS

| 720,136 A | * | 2/1903 | Halliran | ................. | A01K 97/24 |
| | | | | | 43/17.2 |
| 2,765,567 A | * | 10/1956 | Fifer | ...................... | A01K 97/24 |
| | | | | | 43/17.2 |

(Continued)

OTHER PUBLICATIONS

International Search Report and Written Opinion mailed Aug. 23, 2021 for PCT Application No. PCT/IB2021/053678.

*Primary Examiner* — Christopher D Hutchens

(57) ABSTRACT

A device for retrieving the snagged fishing lure when fishing from a boat and from the shore when the snagged lure is both close to and far from the fisherman, especially when the angle of inclination to the lure is small. The hydrodynamic, slim, elongated, and cylindrical device has a sleekly tapered front part, a rear part, a hooking plate inclined at an acute angle with respect to the rear part, a center of gravity shifted towards the front of the device, two attachment rings to attach the device to the line simply, quickly, easily and reliably, while the contact of the device with the line is minimal. When the device is attached to the fishing line extending to the snagged lure, the line is inserted into the funnel-shaped notch of the hooking plate, and when the fishing rod is raised, the device slides down the line to the lure and bounces it off the obstacle. If the lure is not released, the device shall be pulled back towards the fisherman by the retrieval cord attached to the end of the device, while the device follows the tensioned fishing line, until the connecting element that connects the leader with the fishing line is trapped in the passage of the hooking plate and the lure is released from the obstacle by force.

4 Claims, 4 Drawing Sheets

(56) References Cited

U.S. PATENT DOCUMENTS

Figure 1:
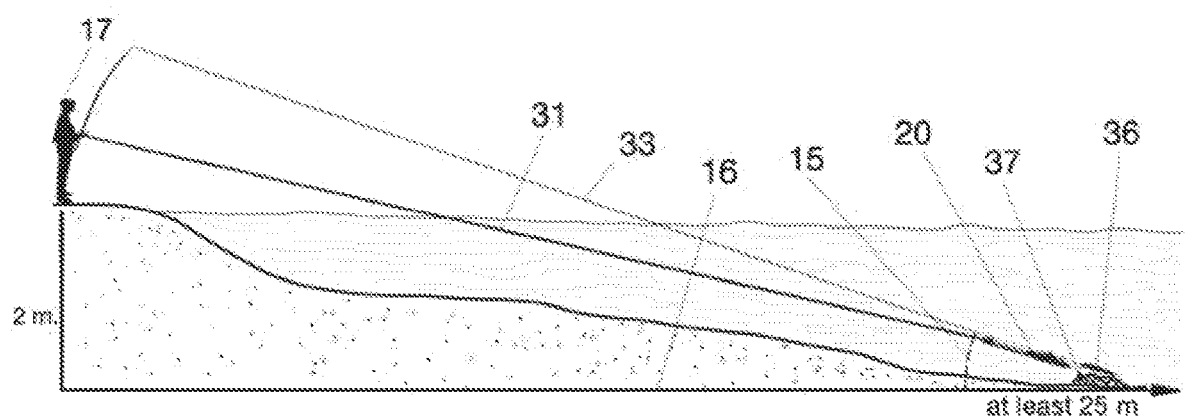

| | | | | |
|---|---|---|---|---|
| 2,909,861 | A | * | 10/1959 | Leming .................. A01K 97/24 43/17.2 |
| 2,979,847 | A | * | 4/1961 | McKinney ............. A01K 97/24 43/17.2 |
| 3,039,223 | A | * | 6/1962 | Pavek .................... A01K 97/24 43/17.2 |
| 3,643,366 | A | * | 2/1972 | Gates ..................... A01K 97/24 43/17.2 |

* cited by examiner

DEVICE FOR RETRIEVING THE SNAGGED FISHING LURE

TECHNICAL FIELD

The invention belongs to the field of fishing devices, and, more particularly, to devices for retrieving the snagged fishing lures.

TECHNICAL LEVEL

With each year, the artificial lures used by fishermen, such as spoon baits, wobblers, spinners, rubber baits, micro baits, including those not listed here, are rapidly evolving, but at the same time becoming more expensive. Not any fisherman tends to lose his favorite valuable lure when it snags to an obstacle under the water or above the water. In this case, the fisherman will make every effort to retrieve his snagged lure. This is also important from an environmental point of view, as snagged lures that are left underwater pollute water with rusting metals, lead, rubber, and plastics, as well as endanger people and animals with their sharp hooks and broken sections of the fishing line. As fish stocks dwindle, fish becomes more cautious, so to catch the fish, the fishing lines used are as thin as possible and thus of limited strength. When the fisherman tries to free up the snagged lure by simply pulling the fishing line hard, the latter does not withstand the tensile load and breaks. Fishermen need supportive tools to effectively free snagged lures and prevent water pollution. To date, many devices have been developed to achieve this goal, but the effectiveness of most of them when fishing from shore is very low, especially at low inclination angles and greater distances between the fisherman and the snagged lure.

Devices designed to release snagged lures can be classified into the following main groups:

1. Telescopic poles. These are reliable snagged lures release devices but with very limited use, and inconvenience to carry and transport. The limiting factor is the length of the device. In the case of this device, the snagged lure can be retrieved directly gripping the snagged lure with a solid pole, but reach distance is limited by the length of the pole. Examples of such devices may be those described in the following patent documents: U.S. Pat. No. 6,694,664 (published 24 Feb. 2004) U.S. Pat. No. 6,305,119 (published 23 Oct. 2001), U.S. Pat. No. 4,622,772 (published 18 Nov. 1986), US2018/0213762 (published Feb. 8, 2018), U.S. Pat. No. 8,539,711 (published 24 Sep. 2013), U.S. Pat. No. 10,034,469 (published 24 Mar. 2016), U.S. Pat. No. 5,216,828 (published Aug. 6, 1993).
2. Devices that are attached to the fishing line and that slide to the snagged lure by gravity and are intended to retrieve the snagged lure in one of the two ways:
    2.1 To hit the snagged lure and release it by pushing. Probably, the most hydrodynamic device in this group is the device described by J. Wilkinson in the U.S. Pat. No. 4,986,022 (published 1991 Jan. 22), which has one major drawback, such as high friction between the fishing line and the device body. In general, devices in this category are not very popular among fishermen, as the effectiveness of retrieving the snagged lure only by hitting it is low.
    2.2 To retrieve the snagged lure off the obstacle by pulling it. These devices are fitted with a separate pulling cord that can withstand a high tensile load. The fisherman, using this cord, pulls the device towards himself and tears the lure of the obstacle afterward, when the device has slid to the lure and gripped some part of the lure with special hooking elements (wires, chains, hooks, etc.) attached to the device, or with the body of the device. For example, such a device is disclosed in the patent document CA1156834 (published Nov. 15, 1983). This is the most popular group of retrieving devices. The device presented by Hunt in the U.S. Pat. No. 2,827,730 (published 1958 Mar. 25) is a good example of a hydrodynamically well-shaped device, however, its lure-hooking solution does not allow to grab the lure reliably, simply, and quickly.
3. Devices that move towards the snagged lure not only due to the gravitational force but also by the help of additional mechanisms generating the movement. For example, the device described by C. Gordon in the patent application CA2167458 (published 30 Mar. 1997). Such devices are complex to produce and to use, they are highly-priced, therefore, not popular.

The most popular and commercially attractive direction in the development of fishing lure retrievers, due to the best efficiency and price ratio, are the devices that can be attached to the fishing line at the end of which is the snagged lure. The present invention belongs namely to this direction of fishing lure retrievers. Even though such devices have been in development for more than 70 years, none of them have experienced any great commercial success due to their design specifics which limit areas of their effective operation. Many different designs of retrieving devices have been developed, however, such devices, even if they work effectively, do only at a very high (close to perpendicular) angle of inclination, or in a short distance between the fisherman and the snagged lure. For example, the device described by E. L. Mudd in the U.S. Pat. No. 3,176,425 (published Jun. 4, 1965). Modern fishing equipment allows the fisherman to cast the lure at a long distance. In order to catch an unalerted fish, the fisherman tries to cast his lure as far as possible, to navigate the lure as close as possible to the bottom or any object of protection where the fish may be hiding. As a result, snags of the lure usually occur when the lure is far away from the fisherman, and the angle of inclination towards the snagged lure is small. If the fisherman cannot reduce the distance to the point of a snag (e.g., when fishing from the shore), the existing fishing lure retrievers are ineffective. The reasons are:

They are too heavy. Also, often the whole weight of such devices is transferred to the fishing line, on which the device is hung, in a single point or a narrow area of the device. For this reason, when the device slides down the fishing line due to the force of gravity, after a short distance, it critically sags down the line thus the inclination of the line becomes insufficient and the device stops moving. To make the device slide further to the snagged lure, it is necessary to tension the fishing line so tightly that it simply does not withstand the tensile load and breaks. This results in the loss of the lure.

Shape of devices is not streamlined enough, for the device to slide a long distance to the snag. For example, such as L. Kowal's device with a flat front in the U.S. Pat. No. 4,536,984A1 (published 27 Aug. 1985), or W. Ostrowski's rectangular device in the patent document PL186644A (published 28 Aug. 2000).

Size, the shape of hooking-to-lure elements and theirs positioning in the front of the device hinder sliding of the device underwater towards the snagged lure, or the hooking elements themselves hook to various obstacles before the device reaches the lure. Examples of such devices are found in the U.S. Pat. No. 4,057,925A (published 15 Nov. 1977), in the U.S. Pat. No. 6,705,040 (published 16 Mar. 2004), in the patent KR200445918Y1 (published Oct. 9, 2009).

Device attachment to the fishing line designs hinder the device from sliding down underwater, thus preventing the device from sliding far enough:

i) This is typical of devices having a non-hydrodynamic shape, or having very long attachment wires for attachment to the line whereby the device hangs too far from the line and its movement vector does not coincide with the trajectory of the line. Therefore, such a device cannot slide down far enough. Examples of such devices are found in the US patents U.S. Pat. No. 3,216,143 (published Sep. 11, 1965); U.S. Pat. No. 5,209,006 (published Nov. 5, 1993).

ii) This is typical of devices having such attachment-to-the-line where the line can slip out through the open space left in the attachment elements, thus the device, when being wiggled intensively, can detach from the line, as in the aforementioned patent U.S. Pat. No. 4,536,984A by L. Kowal.

iii) This is also typical of devices having overly-closed attachment-to-the-line solutions preventing the device to detach from the line. However, a result is relatively high friction between the device and the line, and this friction hinders the device to reach the snagged lure. Examples of such devices are disclosed in patent documents AU1353783 (published 25 Jun. 1987); U.S. Pat. No. 3,805,435 (published 23 Apr. 1974). This is especially characteristic for devices where the attachment-to-the-line solution is such that the line is inserted inside the device. Although such a technical solution determines the best diving angle of the device towards the snagged lure with respect to the line, however, there is a problem of a large contact area and, consequently, the friction between the device and the line. Moreover, the water flow passing through the core of the device degrades the hydrodynamic characteristics of the device and results in a shorter sliding distance. Examples of such devices are described in the US patents U.S. Pat. No. 8,302,344B2 (published Jun. 11, 2012); US2016/0219856 (published Apr. 8, 2016). Therefore, these devices are also not designed for sliding long distances underwater at a small inclination angle.

Available on the market devices that can be attached to the fishing line at the end of which is the snagged lure are mostly designed for fishing from a boat. This means that when the lure gets snagged to an underwater obstacle, the fisherman can position the boat directly above the snag and lower down the retriever device along the line, even perpendicularly, regardless of the shape of the device, its hydrodynamic characteristics, streamlines, weight balance, and so on. On the other hand, the fisherman, being able to freely change his position relative to the snagged lure, has good possibilities to release the snagged lure without any additional devices, just by changing his position to 180-degrees-opposite to the snagged lure, and pulling the lure in the direction opposite to that of the snag. For this reason, existing on the market devices, which can effectively operate only in perpendicular conditions or at high angles of inclination, are not in high commercial demand. Such retrieving devices are completely inefficient in conditions where inclination angle is small and distances are longer.

The listed prior art solutions have drawbacks compared to the solution presented in this description. The technical solution presented in this description does not have the above-mentioned problems: the device effectively retrieves the lure in all fishing conditions. Especially, when there is a sufficiently long horizontal distance and a small angle of inclination between the fisherman and the snagged lure. Especially when fishing is done from the shore of any water body, quay, and other places that do not allow the fisherman to change the direction of pulling the lure into the opposite to that of the snag. The device is versatile, simple and convenient to use, compact for storage and transportation, commercially attractive, easy to manufacture, robust, reliably designed, durable, environmentally friendly; the device can be attached to the fishing line quickly and easily, as well as easily deattached. The device damages neither the fishing line nor the lure during the entire use of the device.

DESCRIPTION OF THE INVENTION

The invented new device consists of an elongated, solid, sturdy, cylindrical body 20, usually made of stainless steel; its front end 21 being directed to the snag 37 is smoothly tapered; and at the opposite end, a half-circle eyelet 30 is attached, to which the retrieval cord 31 for extracting the device with the snagged-lure is tied. The body 20 of the device must be made of a high-density, heavier-than-water material, the body 20 generally having a smooth surface and made of a corrosion-proof material, for example, stainless steel. The Body 20 has an upper part comprising all the structural elements attached to the body 20, such as rings 26 and 28 for attachment to line 33 and the hooking plate 25, and the lower part. The device is attached to the fishing line 33 of the snagged lure 36, by inserting the line 33 into two stainless steel attachment rings 26 and 28 that are attached to the device body 20 in a special way. The present invention allows to set the device into the "operating" position very quickly, simply, conveniently and the device reliably remains in this position until lure 36 is retrieved by the fisherman. In the operating position, the device contacts the fishing line 33 at only two points with the inner surfaces of the cylindrical attachment rings 26 and 28. The attachment rings 26 and 28 are cylindrical to ensure minimal contact with the line and thus minimal friction that does not hinder the movement of the device down the line 33. The circular attachment rings 26 and 28 ensure free and safe movement of the fishing line 33 over the entire inner surface of the attachment rings 26 and 28 with the same minimal friction at all points on the inner surfaces of the attachment rings 26 and 28, regardless of how the device is being moved relative to the tensioned fishing line 33. The attachment rings 26 and 28 are rigidly fixed within the device body 20, therefore, when the fishing line 33 is in a tensioned state, the contact area between the attachment rings 26 and 28 and the line 33 does not change, regardless of how the device is being moved relative to the tensioned line 33. Between the front attachment to the line 33 ring 26 and the rear attachment to the line 33 ring 28, at an angle of not more than 50 degrees to the longitudinal axis of the device, a special hooking plate 25 with a funnel-shaped notch is attached within the device body 20, where in the passage 55 of the notch, at least one of the leader and the fishing line connecting elements 39 (such as ring, spinner, etc.) is being trapped. The upper part of the device body 20 from its center towards the end of the device body 20 is specially thinned to half the thickness of the device, for the center of gravity of the device to be more shifted towards the front end of the device. The center of gravity of the device is shifted closer to its front end for the purpose that at a small angle of inclination 15, the device slides down along the fishing line 33 as far as possible, towards the snagged lure 36. The higher the angle of inclination is, the faster, and with a bigger inertial force the device slides down along the line 33. The weight of the device is optimal: it is not too heavy, the device affected by the gravity does not sag down the line 33 to such critical point, where the device sliding would stop before it reaches the snagged lure 36; but, it is also not too light for a device subjected to the resistance of water and to the friction with the fishing line 33, which would stop moving the device due to lack of its inertial force. The weight of the device is distributed throughout the whole elongated device body 20, and the points of attachment of the device to the fishing line 33 through the attachment rings 26 and 28 are located as close to the ends of the device as possible. In this way, the force of gravity acting on the device and transferred to the line 33 is distributed over a larger section of the line, which prevents the line 33 from being sagged down at one critical point, where the device movement would stop due to insufficient inclination and excessive friction. The size, weight, and streamlined solid elongated shape of the body 20, free of hooks or other large constructional protrusions, allows the device to slide easily through various obstacles underwater or above it, such as grass, tree branches, or the like. The snagged lure 36 can be released from obstacle 37 in 2 ways:

a) By pushing (at a higher angle of inclination). Due to its particularly streamlined hydrodynamic shape, the shifted-forward center of gravity, the overall balance of weight and size, low friction with the line 33, which results in high acceleration of the device sliding down the line, thereby, the device reaches the snagged lure 36 with great force and being able to bounce it off the obstacle 37.

b) By pulling, when the angle of inclination is not so large for the device to acquire sufficient inertia and force to bounce the lure 36 off the obstacle 37 as it slides down the line. Very often, even a considerable angle of inclination does not help to bounce the lure 36 off obstacle 37, so an efficient and reliable actuation of the pulling principle can ensure the ultimate success. If the bounce does not release the lure 36 from obstacle 37, the fisherman can pull the device by the retrieval cord 31 attached to the end of the device body 20 via the tensioned line 33 towards himself until element 39 connecting the leader 38 with the line 33 is trapped in the hooking plate's passage 55 and the lure 36 is retrieved from the obstacle 37 by pulling force.

SHORT DESCRIPTION OF DRAWINGS

FIG. 1. depicts the operating conditions of the device when fishing from shore, when the lure is snagged at a long distance from the fisherman, especially at a small angle of inclination.

Figure 2:
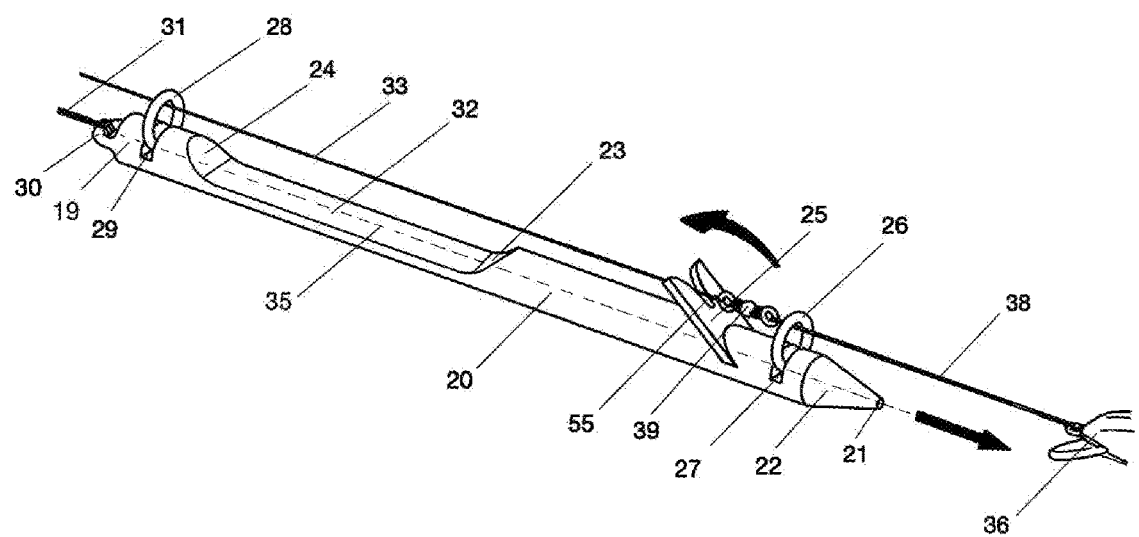
Figure 3:
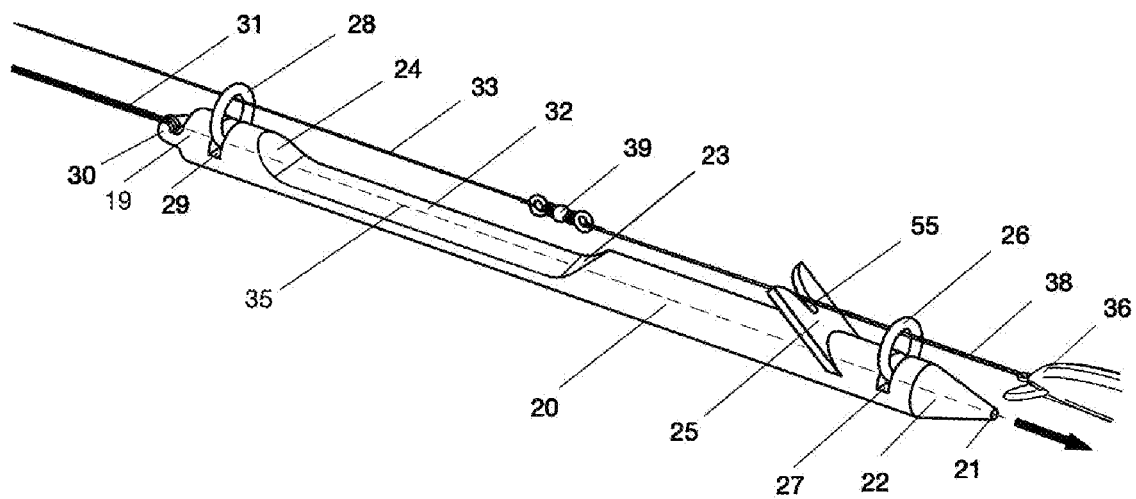
Figure 4:
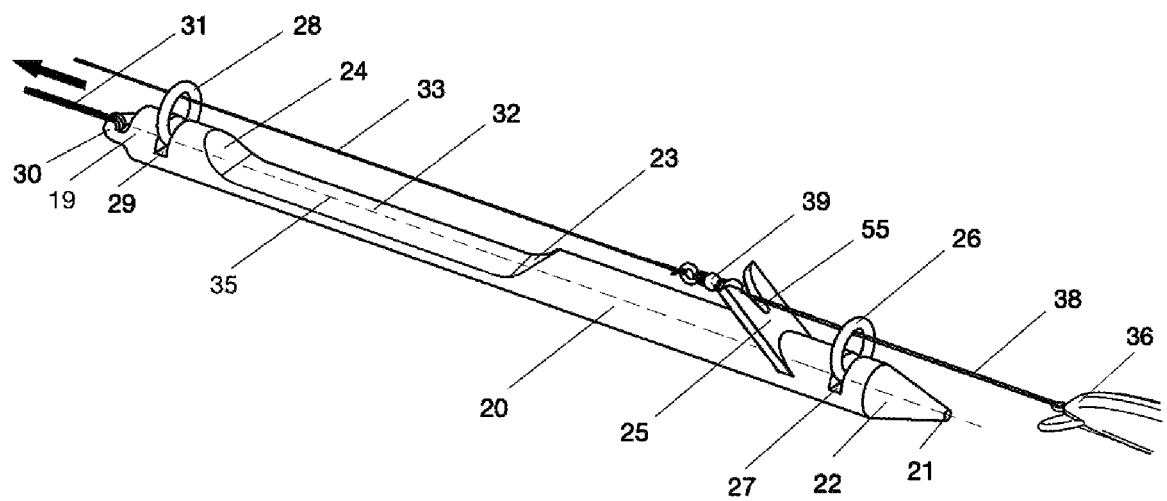
Figure 5:
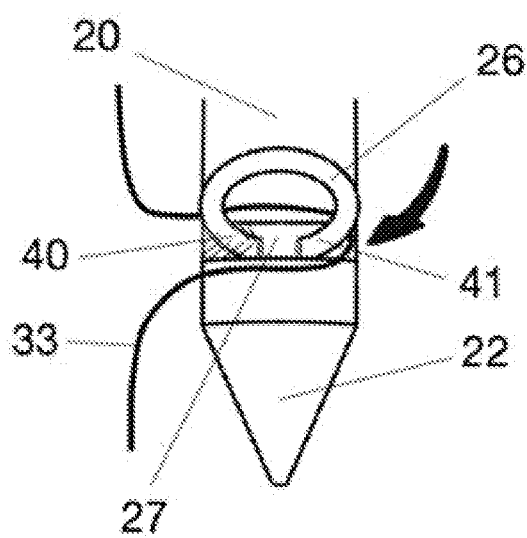
Figure 6:
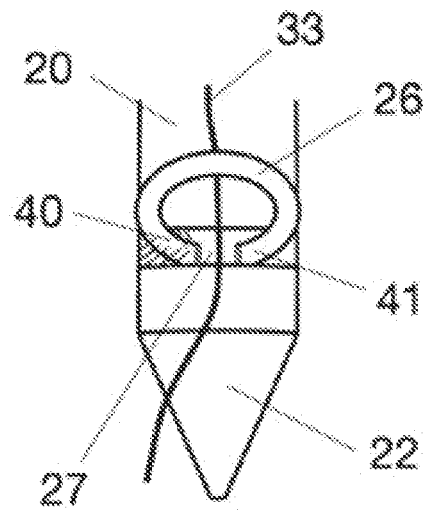
Figure 7:
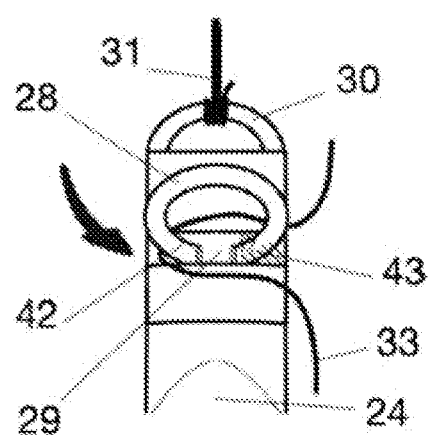
Figure 8:
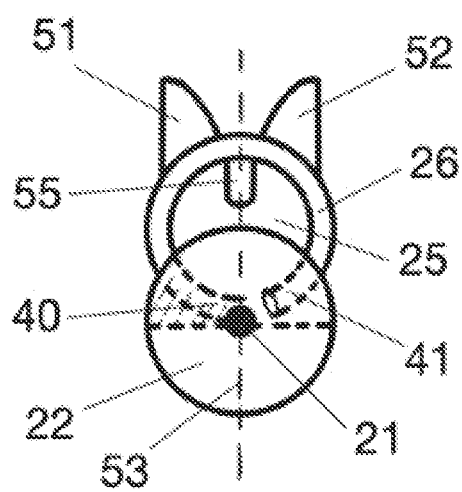
Figure 9:
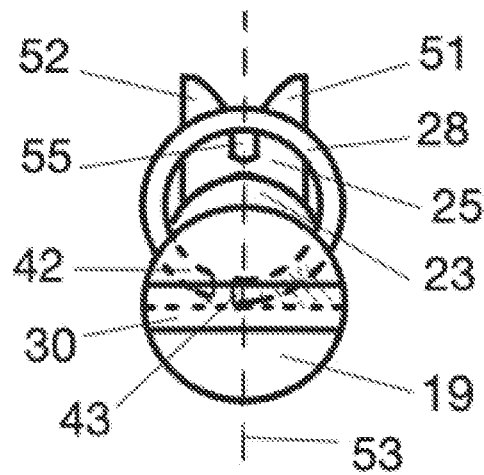
Figure 10:
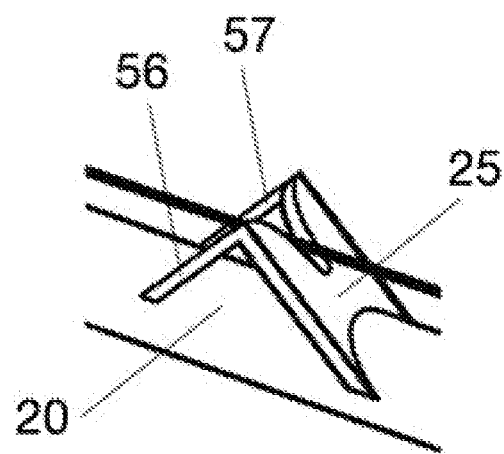

FIG. 2. depicts the sliding movement of the device down the line towards the snagged lure before the element connecting the leader with the line slides through the passage of the hooking plate;

FIG. 3. depicts the sliding movement of the device down the line towards the snagged lure before the device bounces off the lure;

FIG. 4. depicts the pulling movement of the device back via the fishing line towards the fisherman until the element connecting the leader and the line is trapped in the passage of the hooking plate of the device;

FIG. 5. depicts the starting step of insertion of the line into the front attachment ring;

FIG. 6. depicts the ending step of insertion of the line into the front attachment ring;

FIG. 7. depicts the starting step of insertion of the line into the rear attachment ring;

FIG. 8. is a perspective view of the device from the front end;

FIG. 9. is a perspective view of the device from the rear end;

FIG. 10. depicts a modification of the device where the inclined position of the hooking plate is reinforced with supporting arms.

THE MOST PREFERRED EMBODIMENTS OF THE INVENTION

A new device invented for retrieving the snagged fishing lure 36 from underwater obstacles 37 located not only below the fisherman (when fishing from a boat) or close to him (when fishing from the shore), but also at a long distance from the fisherman 17, especially, when the distance is longer than 25 meters and the inclination angle 15 is small, as shown in FIG. 1. Under these conditions, due to its hydrodynamic shape, weight and size balance, small and streamlined constructional parts attached to the device body 20, minimal contact with the line 33, the device described here can slide down the line 33 to a distance, e.g., 25 m. and more, only by the means of gravitational force (FIG. 1). The line 33 can be any thin, flexible and strong material for attaching an object underwater, such as a fishing line, a rope, a cable, and the like. The newly invented device can also be used to retrieve the lure (or other objects) from obstacles above the water, as long as there is sufficient slope to the snagged lure. The base of the device consists of a narrow (for example 10 mm), elongated (for example 17-20 cm in length), cylindrical or cylindrically-shaped device body 20, which has two easily recognizable ends: a smoothly tapered front end 21 and a rear end 19 ending with an eyelet 30, to which the retrieval cord 31 is attached. (FIG. 3). The maximum width of the eyelet 30 is not greater than the width of the device body and the thickness is such as to withstand the load of pulling the lure 36 from the obstacle 37. The eyelet 30 is usually made of a bent stainless steel cylindrical wire and is attached to the end of the device body 20 in a horizontal position. The body 20 of the device is usually made of a solid stainless steel rod, but can also be made of other sinking materials heavier than water, usually with a smooth surface, resistant to corrosion. For the center of gravity of the device to be displaced towards the front part 21 of the device, the device body 20 has a specially thinner section 32 from its center towards the rear attachment ring up to half the thickness of the device body 20. The surface of this device body part 32 is horizontally flat to the device axis 35 over the entire width of the body 20. To maintain the streamlines of the device body 20, the thinner part 32 is joined with the top part of the device body at an inclined angle of 45 degrees with respect to device axis 35 in section 23 over the entire width of the body 20 on the forward end and at the same section 24 on the rear end. In the case where the upper part of the device body is made thinner, the inclined portion 24 of the thinner part of the device body 20 returns to the full cylindrical circumference of the device body 20 as close as possible to the beginning of the groove 29, e.g., within a few millimeters. The thinner parts 23, 32, 24 of the device body can be materialized in the upper part of the device body (the same side where the attachment rings 26, 28, and the hooking plate 25 are installed) or in the lower part of the device body.

The device is attached to the fishing line 33 via 2 attachment rings: the front ring 26 and the rear ring 28. Both attachment rings are usually made of stainless steel cylindrical wire bent into regular circles. The circles are not closed, both attachment ring 26 and ring 28 each have a small gap, the width of which is such that a fishing line 33 of various thicknesses can pass through it. The attachment rings 26 and 28, with the gaps downwards, are attached to the bottoms of the grooves 27 and 29 cutted in the device body so that the gaps are as close as possible to the center of the cylindrical device body (FIG. 8, FIG. 9). Only one end of the attachment ring is attached. If the attachment ring 26 is attached to the bottom of the groove 27 by the end 40, then the end 41 is left free, it does not come into contact with the bottom of the groove 27, but has a minimum gap between the end 41 of the attachment ring 26 and the bottom of the groove 27. The gap is only large enough to allow the line 33 to pass through it inside of the attachment ring (FIG. 5, FIG. 6, FIG. 8). In this case, for the groove 29 will be vice versa, i.e. the end 43 of the attachment ring 28 is usually attached to the bottom of the groove 29 and the end 42 is left free, through which the line 33 is inserted into the inside of the attachment ring (FIG. 7, FIG. 9). Such an asymmetrical system of insertion the line 33 into attachment rings 26 and 28 reduces the risk that the line will escape out of the attachment rings through the same side of the device, which would be undesirable. The attachment rings 26 and 28 are attached to the bottoms of the grooves 27 and 29 in such a vertical position that the attachment rings do not touch the edges of the grooves on either side. The attachment rings are optimal in size: their diameter is as small as possible to maximize the streamlines and reduce the hindering when moving underwater, to such a size which still allows for different, different size the leader 38 and the line 33 connecting elements 39, such as swivels, rings, carbines and etc., to pass through the inner diameter of the rings 26 and 28.

The attachment rings 26 and 28 are attached to the device body 20 in two dedicated grooves 27 and 29 cut in the device body 20 (FIG. 4). The front groove 27 is cut behind the conical taper 22 section of the device as close as possible (such as few millimeters) to the point where conical taper 22 section transits to the device body full diameter, perpendicular to the longitudinal axis 35 of the device over the entire width of the device body 20. The rear groove 29 is cut at as close as possible (such as few millimeters) to the end of the rear end 19 of the device body, perpendicular to the longitudinal axis 35 over the entire width of the device body 20. The depths of the two grooves 27 and 29 are generally the same and reach up to half the height of the cylindrical device body 20 (FIG. 8, FIG. 9). The widths of both grooves 27 and 29 are generally the same and equal to the width of the attachment ring 26 or 28, plus a size usually equal to 2 thicknesses of the fishing line 33. In this way, the ends 40, 41, 42, 43 of the attachment rings 26 and 28 and the gaps for inserting the line into the attachment rings are located deep enough at the bottom of the narrow grooves 27 and 29 and are hidden relative to the cylindrical surface of the device body (FIG. 8, FIG. 9). When the device is attached to the line 33 and it is held tensioned, it is not possible for the line 33 to accidentally slip out through the open gaps of the attachment rings and escape from the attachment rings regardless of how intensively the fisherman wiggle the device relative to the line 33.

The purpose of the device hooking plate 25 is to catch and firmly hold to at least one leader 38 and the line 33 connecting element 39, where the element may be a swivel, a carbine, or the like. The hooking plate is symmetrical with respect to its vertical centerline 53 (FIG. 8, FIG. 9). An essential element of the hooking plate 25 is a funnel-shaped notch dividing the upper part of the plate 25 into 2 symmetrical ears 51 and 52. The notch narrows (usually evenly) from the edges of the top of the plate toward the centerline 53 of the plate 25. The upper part of the notch performs the function of guiding the various connecting elements 39 that connect the leader to the line 33 to the notch passage 55. The notch narrows (usually evenly) until it reaches its narrowest width of the notch passage 55, which is sized to accommodate the line 33 without touching the edges of the notch passage 55. This narrow notch passage 55 of the hooking plate catches various different-size constructional elements 39, e.g., swivels, rings, or carbines, that are made to connect the leader 38 to the line 33. The funnel is terminated in such a narrow closed passage 55 so that it can trap even the smallest elements 39 used in fishing, which connect the leader to the line.

The hooking plate 25 is attached at its lower part to the cylindrical device body 20 at an angle not exceeding 50 degrees with respect to the axis 35 of the device between the attachment rings 26 and 28, closer to the front attachment ring 26 (usually, ~15 mm to the front attachment ring), but not too close so as not to interfere with as smooth as possible sliding of constructional elements 39 that are made to connect the leader 38 to the line 33 through the attachment ring 26 and the funnel-shaped notch of the hooking plate 25. The width of the hooking plate 25 does not exceed the maximum width of the device body 20. The hooking plate 25 is attached to the device body 20 in such a position that all of the following conditions apply:

As seen from both the front and the rear (FIG. 8, FIG. 9), the symmetry (center) line 53 of the hooking plate 25 coincides with the axis line 35 of the device. In this way, when the line 33 is inserted to the inside of the attachment rings 26 and 28, and the line 33 is positioned in the notch of the hooking plate 25 and the line 33 is tensioned (the device hangs freely on the line 33 with all of its weight at that time), the line 33 must be in the notch passage 55 and have no contact with the edges of the notch passage 55. The perspective view from the front and the rear of the device in such a plane when the attachment rings 26 and 28 coincide in one projection should be as shown in FIG. 8, FIG. 9. The hooking plate 25 is positioned at an acute angle with respect to part of the body 20 that is behind the hooking plate, and the hooking plate 25 is inclined at an angle of not more than 50 degrees to the longitudinal axis 35 of the device body 20, which is also the same with respect to the longitudinal axis 35 of the device.

The hooking plate 25 is usually made of stainless steel and its thickness is such that the hooking plate 25 does not bend when the lure is pulled off the obstacle 37. For a very heavy loads (powerful sea fishing tackles, lines and lures), a hooking plate 25 with two supporting arms 56 and 57 extending from the tops of the notch ears to the surface of the cylindrical device body 20 are used to fix and reinforce its inclined position relative to the body of the device; the supporting arms make an angle of 90 degrees to the hooking plate 25 and are rigidly fixed to the body surface at the point of contact (FIG. 10).

FIG. 2, FIG. 3, and FIG. 4 are schematic illustrations of the principle of operation of the device. The described device, attached to the fishing line 33 at the end of which there is a lure snagged to an underwater obstacle 37, even at a small angle of inclination, slides down the line 33 with the help of gravitational force to the snagged lure 36 and bounces it away from the obstacle 37 (FIG. 3). If the lure 36 is not successfully bounced off the obstacle 37, then the fisherman has the $2^{nd}$ possibility after the line 33 is tensioned to pull the device backward towards himself by the retrieval cord 31 attached to the rear end of the device until the connecting element 39 used to connect the leader 38 to the line 33 is trapped in the passage 55 of the hooking plate. The hooking plate 25 is constructed and attached to the device body 20 in such a way that when the device moves down the line 33 to the snagged lure 36, the connecting elements 39 that are made to attach the leader 38 to the line 33 easily slip through the notch (due to the blunt angle in this direction of the movement) and the narrowed notch's passage 55 of the hooking plate 25. (FIG. 2), but, when the device is pulled back towards the fisherman on a tensioned line 33, the connecting elements 39 that are made to attach the leader 38 to the line 33, due to the special inter-positioning of the attachment rings 26 and 28 and the funnel-shaped notch, are directed straight into the notch passage 55 of the hooking plate, and due to inclination of the hooking plate 25 are pressed deep into the narrow notch passage 55 (due to the acute angle in this direction of the movement), the width of which prevents the connecting elements 39 from passing through such a narrow gap (FIG. 4). In this way, the snagged lure 36 is forced off the obstacle 37 by further pulling the retrieval cord towards the fisherman until the lure 36 is released, the hooks of the snagged lure stuck in the obstacle 37 are unbend, or the lure 36 is pulled to the fisherman together with the entire obstacle 37. A high pulling force may be employed when using extremely strong fishing leaders 38, where the fastening element 39 of the leader 38 is attached to the binding end of the fishing line 33, and gets stuck in the channel 55 of the hooking plate. Due to the stainless steel used in the manufacture of the device, its constructional specifics, and unique design, the use of the device does not damage the structure of the line 33, does not affect its strength, and does not damage the lure 36.

When the device is attached to the fishing line 33 and the line 33 is tensioned, the device is in a parallel position with respect to the line 33, and the distance between the line 33 and the surface of the device body 20 is only half the thickness of the device body. In this way, even at a small inclination angle between the fisherman and the snagged lure 36, the directional vector of movement of the device coincides with the inclination trajectory of the tensioned line 33 (FIG. 2, FIG. 3, FIG. 4). This allows the device to slide down the line 33 as far as possible.

The device can be used on fishing lines 33 of various diameters with leaders 38 of various diameters attached to them and intermediate elements 39 of various diameters and configurations connecting them, such as, for example, swivels, carbines and the like. The device can be used in all fishing locations, including (but not limited to): fishing from a shore of a river, a lake, a sea or a pond, a quay, a bridge, a boat, a ship, etc., both in fresh and salty water bodies, as the device is all made of corrosion-proof material, such as, for example, stainless steel.

When the device is attached to the line 33, the line 33 is inserted into the funnel-shaped notch 55 of the hooking plate, and another end of the retrieval cord opposite to the end that is attached to the device, is held by the fisherman, the device is ready for use and while the fishing rod is raised so that its tip is in a vertical position with respect to the water surface, the device pushed by the gravitational force and increasingly growing momentum slides down the line 33 to the snagged lure 36 and bounces the lure 36 off the obstacle 37. If the bounce does not release the lure 36 from the obstacle 37, the device is pulled back along the tensioned line 33 towards the fisherman by the retrieval cord 31 attached to the end of the device body 20 until the connecting element 39 that is made to attach the leader 38 to the line 33 is caught in the hooking plate's passage 55 and the lure 36 is forced from the obstacle 37 by pulling.

To illustrate and describe the present invention, the above description of the most preferred embodiments is general—the dimensions, the materials, the method of connection, the number of components, and other parameters, and the use and purpose of the device may vary—therefore, shall be considered as an illustration rather than as a limitation. It is not a comprehensive or restrictive description and it is not intended to determine the exact form or embodiment. Modifications may be made to the embodiments described by those skilled in the art without departing from the scope of the present invention, as defined below.

The invention claimed is:

1. A device for retrieving a snagged fishing lure attached to a fishing line (33) via a leader (38) and a connecting element (39), the device comprising:
   a housing (20) configured to be attached to the fishing line (33) extending to the snagged fishing lure, wherein the device is configured to slide down the fishing line (33) to the fishing lure (36) snagged to an obstacle (37) and detach said snagged fishing lure (36) from the obstacle (37), wherein the housing (20) is cylindrical, hydrodynamic and is made of a material heavier than water; and wherein the housing (20) comprises:
   a conical tapered front end section (22) proximal to the fishing lure (36);
   a rear end (19) distal to the fishing lure (36);
   a loop (30) to which a retrieval cord (31) of the device is configured to be attached;
   two straight grooves cut in the device housing (20), each having half the height of the cylindrical housing of the device; wherein the two straight grooves comprise a front groove (27) and a rear groove (29), wherein the front groove (27) is cut behind the conical tapered front end section (22) of the housing (20), said front groove (27) being perpendicular to a longitudinal axis (35) of the housing (20) and extending over an entire width of the housing (20), and the rear groove (29) is cut at the rear end (19) of the device housing, said rear groove (29) being perpendicular to the longitudinal axis (35) of the housing (20) and extending over the entire width of the device housing (20);
   a front ring (26) and a rear ring (28), wherein each of the rings (26, 28) comprises a gap, wherein the front and the rear ring are attached, with gaps downwards, to a bottom of the front groove (27) and rear groove (29), respectively, so that the gaps of the rings (26, 28) are located inside cylindrical device housing (20), proximal to the longitudinal axis (35) of the device housing (20); wherein each of the front ring (26) and the rear ring (28) is rigidly attached to the bottoms of the corresponding front and rear grooves (27, 29) by one end of the ring, while the other end of the ring is free and has a gap to the bottom of the corresponding groove, said gap being equal to at least a diameter of fishing line (33); wherein the front and the rear rings (26) and (28) are attached to the bottoms of the corresponding grooves (27) and (29) in a vertical position so that the rings (26, 28) do not touch edges of the corresponding grooves (27, 29) on either side of the attached rings (26, 28); wherein a width of each groove (27, 29) is equal to at least a thickness of one ring (26, 28) plus a value of two thicknesses of the fishing line (33);

a hooking plate (25), attached to the device housing (20) between the front ring (26) and the rear ring (28), proximal to the front ring (26), wherein the hooking plate (25) makes an acute angle with a part of the device housing (20) extending from the hooking plate (25) to the rear end (19) of the device; the hooking plate (25) has a cut-out funnel-shaped symmetrical notch, tapering evenly from a top towards a middle of the attached hooking plate (25) thereby dividing the hooking plate (25) upper part into two symmetrical cars (51, 52), and terminating in an elongate closed notch passage (55) at a centerline (53) of the hooking plate (25).

2. The device according to claim 1, wherein the notch of the hooking plate (25), the front ring (26) and the rear ring (28) are positioned so that the fishing line (33), when inserted into an opening of the front ring (26) and the rear ring (28) and into the notch of the hooking plate (25), and tensioned, while the device hangs freely on the fishing line (33), is located in an upper part of the notch passage (55) of the hooking plate (25) and does not touch edges of the notch passage (55); wherein the tensioned fishing line (33) is parallel to the longitudinal axis (35) of the housing (20).

3. The device according to claim 1, wherein the housing (20) has a part (32) thinned to half the thickness of the housing (20), said thinned part (32) starting at a longitudinal midpoint of the housing (20) and ending before the rear groove (29).

4. The device according to claim 1, wherein the hooking plate (25) is additionally reinforced with two supporting arms (56, 57) of a same thickness as the hooking plate (25), attached to the symmetrical cars (51, 52) of the upper part of the hooking plate (25), said supporting arms (56, 57) forming an angle of 90 degrees with the hooking plate (25) and extending to a surface of the housing (20) and being rigidly attached to the housing; whereby the supporting arms (56, 57) reinforce an inclined position of the hooking plate (25) with respect to the housing (20).

* * * * *